Aug. 29, 1961  P. H. DIXON  2,997,781
INDEXING MECHANISM FOR ASSEMBLING MACHINE OR THE LIKE
Filed March 10, 1958  4 Sheets-Sheet 1
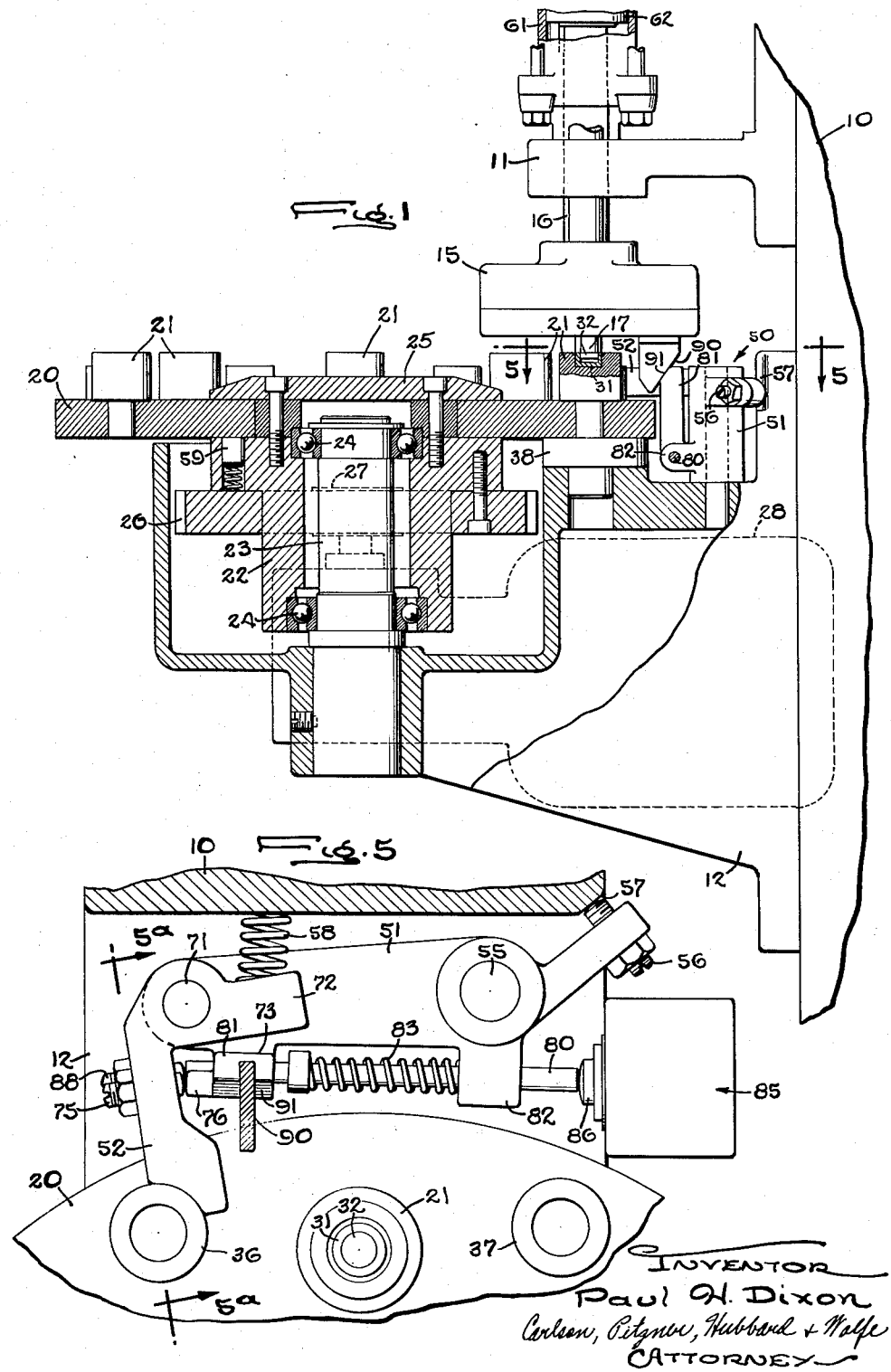
INVENTOR
Paul H. Dixon
Carlsen, Pitzner, Hubbard + Wolfe
ATTORNEY

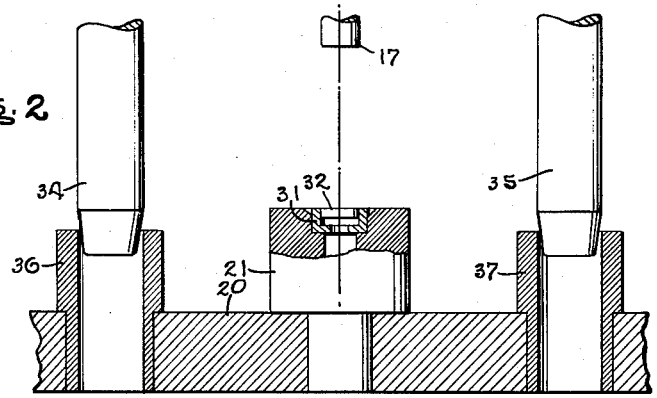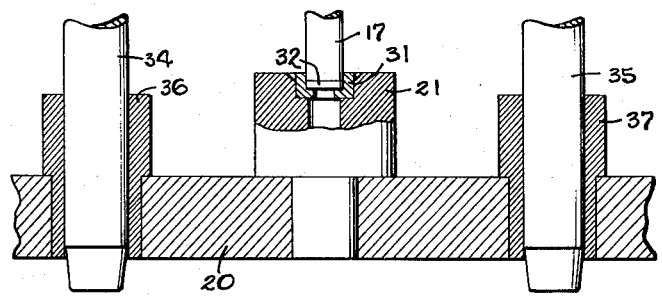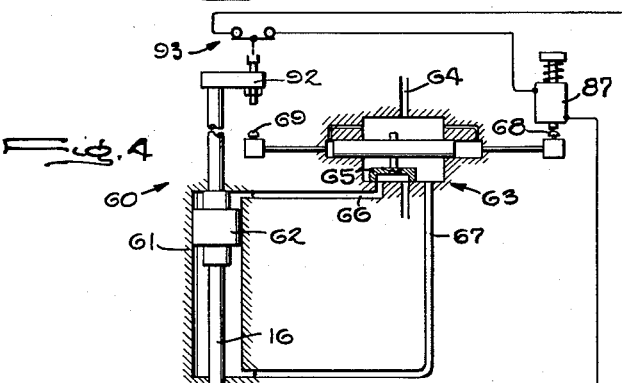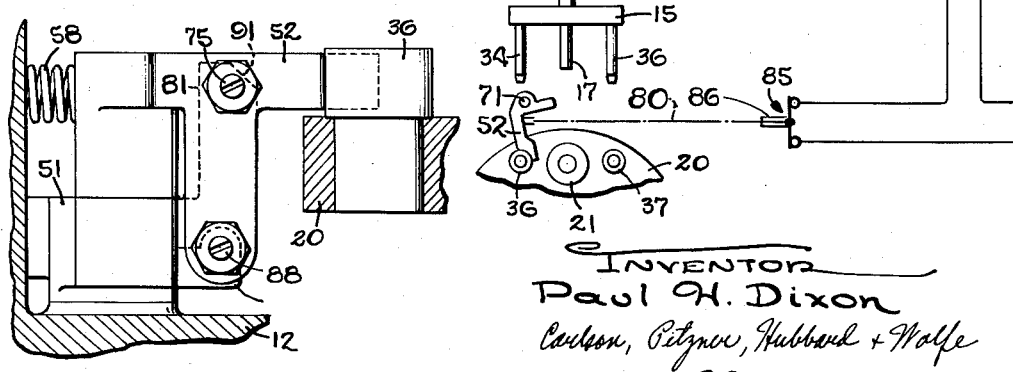

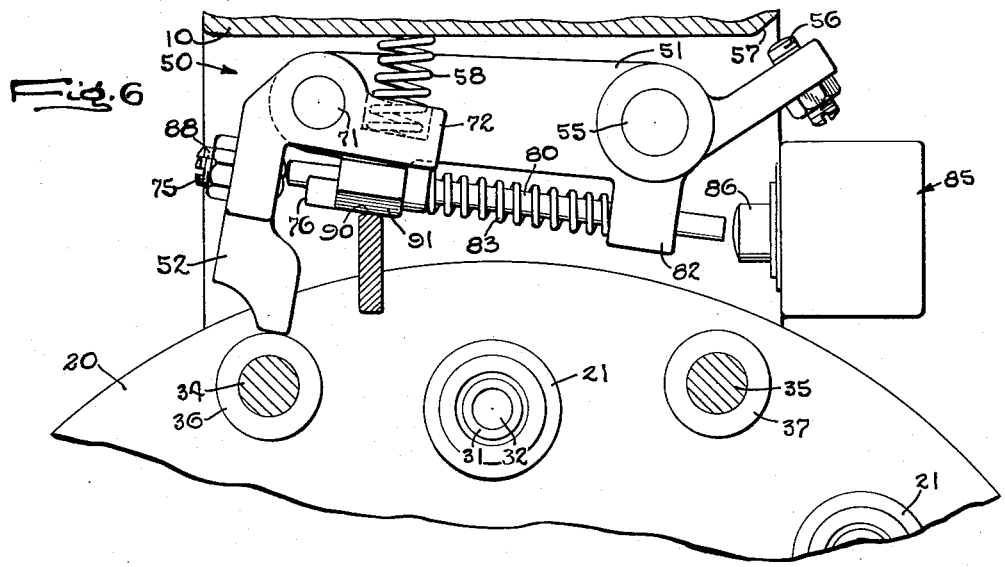
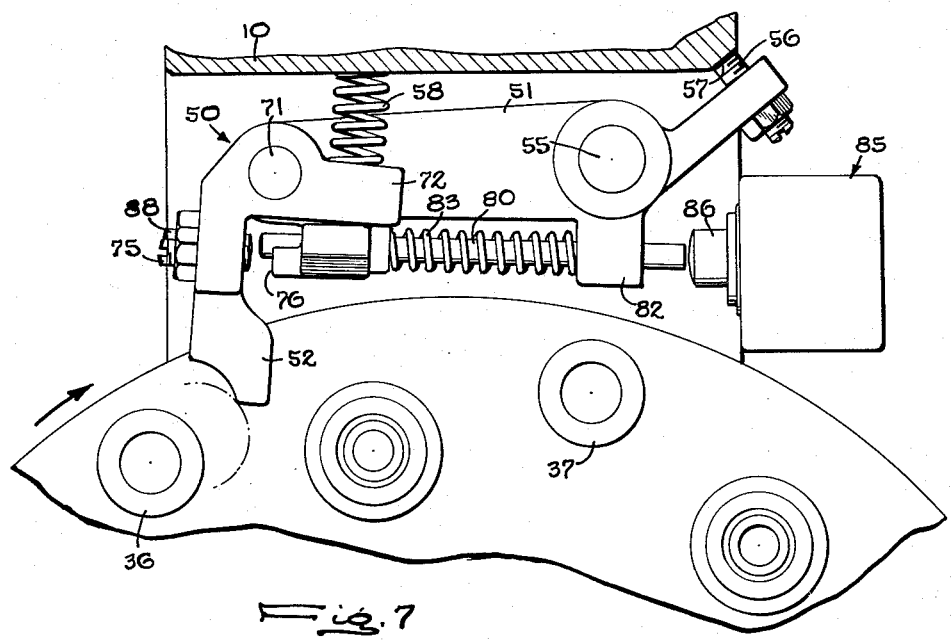

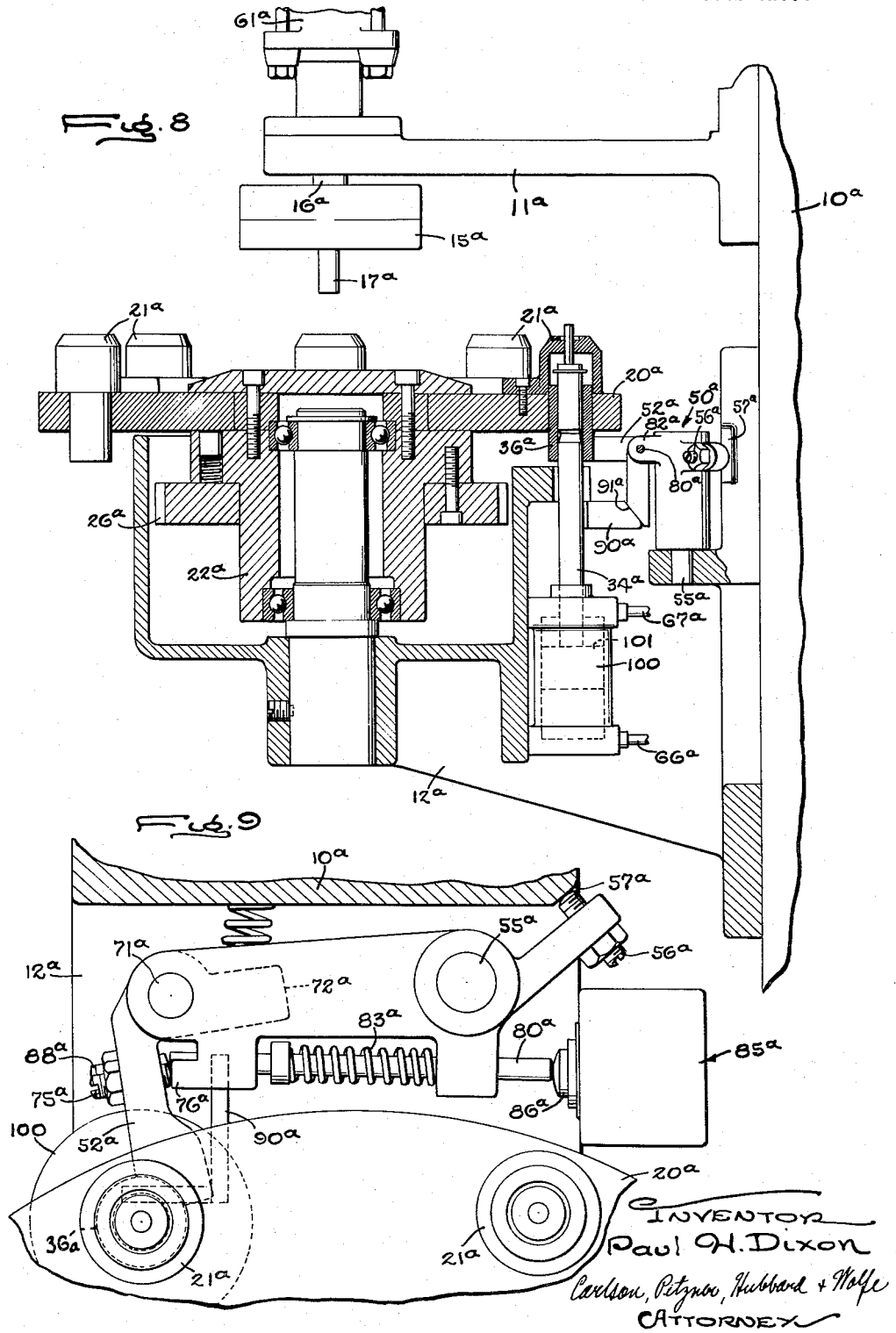

United States Patent Office 2,997,781
Patented Aug. 29, 1961

2,997,781
INDEXING MECHANISM FOR ASSEMBLING MACHINE OR THE LIKE
Paul H. Dixon, Rockford, Ill., assignor to Dixon Automatic Tool, Inc., Rockford, Ill., a corporation of Illinois
Filed Mar. 10, 1958, Ser. No. 720,118
9 Claims. (Cl. 29—208)

The present invention relates to an indexing mechanism for the worktable of a reciprocating-head type of assembling machine.

In recent years there has been a tendency toward automated assembly of mechanical parts and sub-assemblies, a high speed assembly device for screw fastened parts being shown in my copending application Serial No. 706,982, filed January 3, 1958, entitled Automatic Assembling Machine. In machines of this general type a rotatable worktable is employed having spaced receptacles or work stations into which parts are fed successively by an automatic feeding and placing device. The superimposed parts are then indexed into working position where they are acted upon by a reciprocating tool head. Such head may include means for applying a threaded fastener as in the above copending application, may deform a part in some way, or may simply act to press parts together with a press fit, following which the parts are unloaded from the table for use or for successive assembling operations. In order to justify the investment and to enable a maximum return from these machines, the assembling machines are designed to operate at speeds which are many times greater than where manual assembling procedures are used. For example, single machines are capable of handling up to 6000 pieces per hour.

It is an object of the present invention to provide a worktable indexing mechanism for an assembling machine which is capable of extremely rapid indexing. It is a related object to provide an indexing mechanism which is capable of starting and stopping the worktable abruptly, in a complete cycle of less than one second, but in which impact forces are low, thereby to reduce the risk of damaging the impacting parts and to minimize wear so as to produce an assembling machine having a long and trouble-free life.

It is another object of the invention to provide an indexing mechanism for a worktable which is positive and accurate in operation and which insures that the work will be positioned with respect to the head within precise limits of accuracy.

It is a further object of the invention to provide an indexing mechanism which, although possessing the above features, is nevertheless simple and inexpensive to construct and maintain.

In one of its aspects, it is an object of the present invention to provide a novel control system in combination with the indexing mechanism for providing rapid and positive interlocked operation of all of the moving elements thereby to produce a high degree of reliability and safety.

Finally it is an object of the invention to provide an indexing mechanism and control arrangement therefor which is flexible in use and which may be applied to a wide variety of indexing problems and to many different types of assembling machines and the like.

Other objects and advantages of the invention will become apparent in studying the attached detailed description and upon reference to the drawings in which:

FIGURE 1 is a vertical fragmentary section taken through the worktable of an assembling machine to which the present invention has been applied.

FIG. 2 is a fragmentary section looking along the line 2—2 in FIG. 1 and showing initial engagement of the positioning pins.

FIG. 3 is similar to FIG. 2 but taken at the end of the working stroke.

FIG. 4 is a control circuit of the general type which may be employed in carrying out the invention.

FIG. 5 is a fragmentary plan view of the stop mechanism taken on the lines 5—5 of FIG. 1.

FIG. 5a is a fragmentary view looking along the line 5a—5a in FIG. 5.

FIG. 6 is a stop motion view similar to FIG. 5 but showing the camming away of the stop mechanism upon advancement of the head.

FIG. 7 is a further stop motion view showing the stop mechanism in readiness for an ensuing cycle of operation.

FIG. 8 is similar to FIG. 1 but shows a modified form of the invention.

FIG. 9 is a fragmentary plan view of the stop mechanism of FIG. 8.

While the invention has been described in connection with certain preferred embodiments it will be understood that I do not intend to limit the invention thereto but intend to cover all alternatives and modifications falling within the spirit and scope of the claims appended hereto.

Turning now to the drawings, there is shown in FIG. 1 in the form of a vertical fragmentary section, a portion of an assembling machine employing the present invention. The device has a frame which includes a pedestal 10, an upper bracket 11 and a lower bracket 12. Mounted for vertical reciprocation in the upward bracket 11 is a head 15 mounted on a plunger or slide 16 and having a tool 17 for operating upon work pieces to be described. Arranged for rotation below the head 15 is a worktable 20 having work stations 21 spaced about the periphery thereof. This worktable is mounted on a hub 22 which is mounted for rotation about a stationary shaft 23 on bearings 24. The hub includes a top plate 25 which is suitably bolted thereto.

For the purposes of driving the hub, a spur gear 26 is employed which is engaged by a drive pinion 27, the latter being rotated by a power unit 28 which may be in the form of an electric motor having integral gear reduction.

In the ordinary operation of an assembling machine of the present type the work pieces are deposited at the work stations by suitable feeding devices. For example, two members intended to be assembled by pressing together are deposited successively in a work station in alinement with one another, and when such work station is indexed around into a position under the head, the advancement of the head is effective to apply the necessary pressure to press the members together. Subsequently, as the assembled work indexes away from the head, means are provided for removing it from the table. In the present instance the workpieces to be pressed together are indicated at 31, 32 (FIG. 2), the workpiece 31 having a bore into which the workpiece 32 is pressed. For a more detailed discussion of the assembling of workpieces in a device of the present type reference is made to my copending application Serial No. 419,770, filed March 30, 1954, now abandoned. It will be apparent to one skilled in the art that the assembling is not limited to a simple pressing operation but includes the threading together of parts as covered in my earlier mentioned copending application, with the parts being deposited in the work stations by feeding mechanism such as shown in my copending application Serial No. 615,125, filed October 10, 1956, now Patent No. 2,911,081.

For the purpose of insuring precise positioning or alinement between the tool 17 on the head 15 and the work station 21 on the table 20, precise positioning members are employed thereon which engage with one another as the head advances downwardly to act upon the work, engagement taking place over the terminal portion of the downward movement. In the present instance, this precise positioning is brought about by positioning pins 34, 35 on the head which mate with positioning bushings 36, 37 located between adjacent work stations. Thus, as shown in FIG. 2, and assuming that the work station 21 has been advanced to a position under the head, downward movement of the head causes the locating pins 34, 35 to enter the positioning bushings so that the table is positively locked in a precise position at the time that the work (here the pressing together) is accomplished. The final position of the head is set forth in FIG. 3. A back-up member 38 located below the table takes up the pressing force so that it is not transmitted to the table bearings. It will be understood that the assembling operation referred to is simply exemplary and that assembling operations may be accomplished by machines of the present type which require a higher degree of tool-to-work positioning accuracy, particularly where small pieces, such as may be employed in precision instruments, are to be assembled.

In accordance with the present invention a friction drive connection is employed between the worktable and its drive, and a positive but retractable stop is provided to stop the workable at indexed positions for entry of the locating pins. In the present instance the stop mechanism generally indicated at 50 includes a body 51 and a striker 52, the stop being mounted on the frame at the periphery of the worktable and with the striker normally arranged in the path of movement of a plurality of abutments provided on the worktable, the abutments being symmetrically arranged with respect to the work stations. In the present instance, the positioning bushings, for example, the positioning bushings 36, 37 referred to, are utilized as the stop abutments.

In order to position the stop 50 in the path of movement of the table abutments while permitting the retraction referred to, the stop is mounted on a pivot 55 which is spaced outwardly from the edge of the table, and the radial position of the striker is adjusted by means of an adjusting screw 56 which engages an abutment 57 formed on the frame. Urging of the stop into the engaging position shown in FIG. 5 is accomplished by means of a compression spring 58.

The friction coupling between the table and drive referred to above is brought about by making the table 20 slidable with respect to the hub 22 on which it is mounted, friction on the underside of the plate being provided by a series of spring pressed shoes, one of which is shown at 59. The table 20 is held captive by the cover plate 25. From what has already been said it will be apparent that when an abutment, for example, the abutment 36 in FIG. 5, strikes the stop, further movement of the table in the forward direction is arrested so that the work station 21 and the precise locating means associated with it are in register with the head 15 of the machine.

In order to understand fully the next aspect of the invention to be described, it is necessary to have in mind the elements of the control system including the driving means for advancing the head downwardly and upwardly. Referring to FIG. 4 the control system indicated generally at 60 includes an actuator 61 having a piston 62 which is coupled to the plunger 16 which carries the head 15. For the purpose of admitting air to the opposite sides of the piston 62, a "four way" control valve 63 is provided which is fed from air line 64 and which has an internal valve member 65 capable of supplying air to alternate outlet ports 66, 67. Movement in the "down" direction is controlled by a "down" poppet 68 and movement in the "up" direction is controlled by an "up" poppet 69. The poppets are simply venting devices. When the poppet 68 is operated, the right hand end of the valve 63 is vented, thereby causing the valve plunger 65 to move to the right which causes pressure to be applied to the port 66, thereby to cause the plunger 16 to move downwardly. Conversely, when the poppet 69 is operated, the valve member 65 moves to the left, thereby pressurizing outlet port 67 to cause the plunger 16 to move upwardly.

With the above in mind, it is one of the aspects of the invention that means are provided for causing resilient yielding movement at the stop 50 when the latter is struck by one of the abutments on the table and that such yielding movement is utilized to start the head moving downwardly toward the work piece. In the present instance this yielding is brought about by mounting the striker 52 of the stop for yielding movement relative to the stop body 51, with bottoming occurring between the two members after the small amount of yielding movement has been taken up. Thus as shown in FIG. 5 the striker 52 extends radially inward from the stop body and is secured to the latter by a pivot 71. The striker is normally biased in a clockwise direction, i.e., in a direction toward the approaching abutment by providing an extension 72 in which the spring 58 previously referred to, is seated. For the purpose of limiting the forward movement of the striker under the urging of the spring 58 a stop 73 is provided, and to provide positive bottoming of the striker 52 and therefore positive positioning of the worktable, a bottoming adjustment screw 75 is employed which engages a stop abutment 76 on the body of the stop.

For sensing the yielding movement of the striker 52 relative to the stop body, a longitudinally extending switch plunger 80 is provided which is arranged in the path of movement of the striker and slidably received in extensions 81, 82 forming a part of the stop body. The plunger is biased in the extended position by a spring 83. Mounted on the frame of the machine and in the path of movement of the plunger 80 is a control switch 85 having an operating element 86. In carrying out the invention, this switch controls a solenoid 87 for operating the "down" poppet 68. For adjusting the plunger 80 relative to the switch 85, i.e., to insure positive operation of the switch in response to the limited movement of the striker, a plunger adjusting screw 88 is provided which, as shown in FIGS. 5 and 5a, abuts the left hand end of the plunger.

The operation of the device as thus far described will be apparent from FIGS. 4 and 5, although it will be helpful to refer first to FIG. 7 which shows the abutment 36 on the table approaching the striker 52 of the stop 50. In this figure the striker is extended toward the approaching abutment by reason of the compression spring 58, and the switch contacts are open. When the abutment 36 strikes the striker of the stop, the striker yields against the force of spring 58, the friction drive of the table offering sufficient torque to bottom the striker against the abutment 76 in the stop body. This motion is accompanied by movement of the plunger 80. This closes the switch 85 thereby operating the solenoid 87 which in turn operates the poppet valve 68. The latter causes movement of the valve element 65 to the right, thereby pressurizing the port 66 which supplies the upper end of the actuator 61 and causing the plunger 16 and head 15 to move downwardly toward the table.

In accordance with one of the aspects of the present invention, means movable with the head 15 are provided for camming the stop 50 radially outward into an out-of-the-way position during the final portion of the movement of the head and after the locating pins 34, 35 have been engaged with the table. In the present instance this is brought about by providing on the head 15 a cam surface 90 which engages a mating cam surface 91 on the body 51 of the stop. It will be apparent that as a result of this engagement the stop 50 is rotated outwardly from the table about the pivot 55 so that it is no longer effective to prevent rotation of the table 20. However, the cam surfaces 90, 91 operatively engage only after the tips of the positioning pins 34, 35 on the head have begun to enter the bushings 36, 37 in the table. Consequently when the stop 50 is swung to the out-of-the-way position, the positioning pins take over the table-stopping function and the table continues to be locked in place in accurately indexed position for performance of the work by the tool 17.

Means are moreover provided for operating the "up" poppet 69 when the head reaches its lower limit position so that the head is automatically reversed and begins movement upwardly for an ensuing cycle of operation. In the present instance poppet 69 is engaged by an abutment 92 (FIG. 4) located at the upper end of the plunger 16.

In carrying out the invention, means are provided for preventing re-engagement of the striker 52 of the stop with the adjacent abutment on the table, for example, the abutment 36, as the cam surfaces 90, 91 are disengaged from one another during the initial portion of the upward movement of the head. In the present instance, this is brought about by making the range of movement of the striker 52 sufficiently great relative to the size of the abutment which it engages so that when the stop is retracted to its out-of-the-way position the striker will immediately pop forwardly under the urging of the spring 58 into a position in which it is in substantial radial alinement with the abutment and thus incapable of being restored by its spring on a blocking position relative to the abutment. This is brought out in FIG. 6 which shows the cam surfaces in engagement and with the striker 52 outwardly swung to its interfering position. It will be apparent from this figure that disengagement of the cam surfaces simply cause the tip of the striker to come to rest against the outer edge of the abutment 36, and when the table starts forwardly, upon retraction of the locating pins, the striker simply slides over the abutment 36 following which the body 51 of the stop rotates inwardly under the urging of the spring 58 into the path of movement of the oncoming abutment, as shown in FIG. 7.

In addition to performing the functions mentioned above, the resiliently mounted striker performs a still further function, namely the function of cushioning the oncoming abutment thereby tending to reduce the energy of impact. In this connection it will be appreciated that the novel friction mounting of the table permits all of the driving elements including the table hub to rotate continuously, thus only the inertia of the table itself need be overcome upon starting and dissipated upon stopping. Accordingly, the total amount of energy to be disposed of is low. By appropriate design of the spring 58, a large portion of this energy may be resiliently absorbed so that there is only a limited amount of energy which need be absorbed by the direct impact between the abutment and stop. It has been found in a practical case that the impact in the present device is so low that no deformation of the impacting surfaces occurs even upon many thousands of cycles of operation, with the result that the present stop mechanism has a long life and requires little or no maintenance.

To insure that the head will be allowed to return fully to its upraised position before being started on its downward movement, an upper limit switch 93 is provided (FIG. 4) arranged in series with a switch 85 operated by the stop. Consequently two conditions must be met before the head may be advanced downwardly in the next cycle: The table must be indexed into a new position of register and the head must be fully retracted. This however does not impose any substantial delay and it is readily possible using the present arrangement to perform up to a 100 complete cycles per minute, almost two per second. Such rapid cycling is accomplished without developing high impact forces, as stated; and it is not necessary to make any fine adjustments to insure proper timing. A high degree of reliability is inherent since the tool acts upon the work only when the precise locating pins have been inserted into the worktable, thus assembly work demanding the highest degree of precision may be accommodated. The arrangement described is flexible in operation and may be applied to a wide variety of assembling machines, either on new machines when such machines are constructed or on existing machines already in operation on the factory floor. Because of the simplicity of construction the cost is inherently low.

While the invention has been described above in connection with the preferred embodiment employing a cam and locating pins directly on the head it will be appreciated by one skilled in the art that the invention in some of its aspects may be employed in an arrangement where a shot pin or the like, operated in synchronism with the head, performs the functions of precisely positioning the table and also moving the stop to its retracted out-of-the-way position. An alternate embodiment of the present invention is shown in FIGS. 8 and 9. FIG. 8 corresponds in general with FIG. 1 and FIG. 9 corresponds to FIG. 5. Because of the similarity of the two arrangements similar reference numerals with addition of subscript "a" are employed to designate similar elements. It will be understood that the control system for operating the device may be the same as previously described.

The arrangement in FIGS. 8 and 9 may be most readily understood by pointing out the differences with respect to the earlier embodiment. Note that instead of providing locating pins 34, 35 on the head, precise positioning is brought about by a shot pin 34a which extends into a bushing 36a, a number of such bushings being provided around the periphery of the table at the work stations. For operating the shot pin, the latter is connected to an actuator 100 having a piston 101. Air is supplied to the actuator through lines 66a, 67a which are respectively connected to the ports 66, 67 of the main control valve. In the present instance the stop 50a is preferably positioned so that the striker 52a lies in a plane below the table 20a. In this position the striker 52a engages the downwardly projecting portions of the bushings which serve as stop abutments. The camming of the stop 50a to an out-of-the-way position is accomplished in the present embodiment by a cam 90a which is secured to the shot pin 34a and forms a lateral extension thereon and a cam surface 91a which is formed directly on the body 51a of the stop. The direction of the cam surface 91a is just opposite to the direction of the cam surface 91 in view of the fact that the movable cam surface approaches from the bottom rather than from the top; otherwise the operation is the same.

The operation of the embodiment shown in FIGS. 8 and 9 can be readily understood by considering a typical operating cycle. As the abutment 36a approaches the striker 52a, movement of the plunger 80a takes place thereby closing the switch 85a. Simultaneously therewith the striker 52a bottoms with respect to the body of the stop providing positive blocking of further table movement.

Closure of the stop switch 85a and the resultant operation of the poppet 68 causes pressure to be applied to line 66 (FIG. 4) and also to the line 66a (FIG. 8), thus, simultaneously, the head advances downwardly and the shot pin 34a advances upwardly into engagement with the bushing 36a in the table. Continued movement of the shot pin 34a causes camming to take place at surfaces 90a, 91a, thereby camming the stop 50a about its pivot 55a radially into an out-of-the-way position. The stop is thereby made ineffective to hold the table, and the table is maintained in position by the engagement of the shot pin. It should also be noted at this point that the shot pin performs the conventional function of ejecting the assembled work from the work station.

The interlocking of the movements of the head and shot pin in the structure of FIGS. 8 and 9 results from the fact that the actuator 100 is connected to the same control valve as the actuator 61 which moves the head of the machine. The "pneumatic" interlocking provided by this arrangement is not quite as positive as that in the earlier and preferred embodiment. It has been found, however, that speeds may be attained using the arrangement of FIGS. 8 and 9 which are comparable to the speeds obtainable in the earlier embodiment.

While the device has been described in connection with an assembling operation it will be apparent to one skilled in the art that the machine is not limited to assembling of work pieces and a punch or metal forming tool may be substituted for tool 17 shown, with a mating die at each work station, for the punching or forming of a work piece.

I claim as my invention:

1. In an assembling machine or the like, the combination of, a support, a work table mounted on said support to turn about a predetermined axis and having a plurality of work stations angularly spaced around the table, a head adapted to carry a tool and mounted on said support to reciprocate toward and away from said table, a constantly running drive member, a connection frictionally coupling said member and said table to turn the table and bring said work stations successively in line with said head, a plurality of abutments mounted on and angularly spaced around said table, a stop mounted to project into the path of movement of said abutments thereby to stop said table and cause said connection to slip, and a member operable after said table has been stopped to engage the table and locate the latter accurately relative to said head.

2. In an assembling machine or the like, the combination of, a support, a work table mounted on said support to turn about a predetermined axis and having a plurality of work stations angularly spaced around the table, a head adapted to carry a tool and mounted on said support to reciprocate toward and away from said table, a constantly running drive member, a connection frictionally coupling said member and said table to turn the table and bring said work stations successively in line with said head, a plurality of abutments mounted on and angularly spaced around said table, a stop mounted on said support to project into the path of movement of said abutments thereby to engage an abutment and stop said table, said stop being mounted for limited yielding upon engagement by an abutment, and mechanism responsive to yielding of said stop and operable to move said head toward said table.

3. In an assembling machine or the like, the combination of, a support, a work table mounted on said support to turn about a predetermined axis and having a plurality of work stations angularly spaced around the table, a head adapted to carry a tool and mounted on said support to reciprocate toward and away from said table, a constantly running drive member, a connection frictionally coupling said member and said table to turn the table and bring said work stations successively in line with said head, a plurality of abutments mounted on and angularly spaced around said table, a stop, an element supporting said stop and mounted on said support to move between an active position in which the stop projects into the path of said abutments and an inactive position in which the stop is retracted from said path, said stop being supported for limited yielding relative to said element upon engagement by an abutment, and mechanism responsive to yielding of said stop and operable to move said head toward said table.

4. In an assembling machine or the like, the combination of, a support, a work table mounted on said support to turn about a predetermined axis and having a plurality of work stations angularly spaced around the table, a head adapted to carry a tool and mounted on said support to reciprocate toward and away from said table, a constantly running drive member, a connection frictionally coupling said member and said table to turn the table and bring said work stations successively in line with said head, a plurality of abutments mounted on and angularly spaced around said table, a stop mounted to project into the path of movement of said abutments thereby to stop said table and cause said connection to slip, a power operator for reciprocating said head, and control mechanism operable to actuate said power operator and cause said head to move selectively toward and away from said table, said control mechanism being responsive to engagement of an abutment by said stop to cause said head to move toward said table.

5. In an assembling machine or the like, the combination of, a support, a work table mounted on said support to turn about a predetermined axis and having a plurality of work stations angularly spaced around the table, a head adapted to carry a tool and mounted on said support to reciprocate toward and away from said table, a constantly running drive member, a connection frictionally coupling said member and said table to turn the table and bring said work stations successively in line with said head, a plurality of abutments mounted on and angularly spaced around said table, a stop mounted to project into the path of movement of said abutments thereby to stop said table and cause said connection to slip, a power operator for reciprocating said head, control mechanism operable to actuate said power operator and cause said head to move selectively toward and away from said table, said control mechanism being responsive to engagement of an abutment by said stop to cause said head to move forward toward said table, and means operable as an incident to the forward movement of said head to release said stop and condition said table for further turning.

6. In an assembling machine or the like, the combination of, a support, a work table mounted on said support to turn about a predetermined axis and having a plurality of work stations angularly spaced around the table, a head adapted to carry a tool and mounted on said support to reciprocate toward and away from said table, a constantly running drive member, a connection frictionally coupling said member and said table to turn the table and bring said work stations successively in line with said head, a plurality of abutments mounted on and angularly spaced around said table, a stop mounted on said support to move into and out of an active position in which the stop is disposed in the path of movement of said abutments, said stop when in said active position engaging an abutment and stopping said table, mechanism responsive to the stopping of said table and operable to move said head forward toward the table, and means operable upon forward movement of the head to move said stop out of said active position and hold the stop during initial rotation of said table.

7. In an assembling machine or the like, the combination of, a support, a work table mounted on said support to turn about a predetermined axis and having a plurality of work stations angularly spaced around the table, a head adapted to carry a tool and mounted on said support to reciprocate toward and away from said table, a constantly running drive member, a connection frictionally coupling said member and said table to turn the table and bring said work stations successively in line with said head, a plurality of abutments mounted on and angularly spaced around said table, a stop mounted on said support to project into the path of movement of said abutments thereby to stop said table and cause said connection to slip, said table having a recess therein, a member coupled to said stop and operable after said table has been stopped to enter said recess thereby to locate and hold the table accurately relative to said head, and means operable after said member has entered said recess to release said stop thereby to condition said table for further turning.

8. In an assembling machine or the like, the combination of, a support, a work table mounted on said support to turn about a predetermined axis and having a plurality of work stations angularly spaced around the table, a head adapted to carry a tool and mounted on said support to reciprocate toward and away from said table, a constantly running drive member, a connection frictionally coupling said member and said table to turn the table and bring said work stations successively in line with said head, a plurality of abutments mounted on and angularly spaced around said table, a stop mounted to project into the path of movement of said abutments thereby to stop said table and cause said connection to slip, said table having a recess therein, and a member coupled to said stop and operable after said table has been stopped to move into said recess thereby to locate the table accurately relative to said head.

9. In an assembling machine or the like, the combination of, a support, a work table mounted on said support to turn about a predetermined axis and having a plurality of work stations angularly spaced around the table, a head adapted to carry a tool and mounted on said support to reciprocate toward and away from said table, a constantly running drive member, a connection frictionally coupling said member and said table to turn the table and bring said work stations successively in line with said head, a plurality of abutments mounted on and angularly spaced around said table, a stop mounted to project into the path of movement of said abutments thereby to stop said table and cause said connection to slip, said table having a recess therein, a member rigid with said head and movable into said recess as the head is moved toward said table thereby to locate the table accurately relative to the head, and means operable after the table has been stopped to move said head toward the table.

References Cited in the file of this patent

UNITED STATES PATENTS

| | | |
|---|---|---|
| 2,004,464 | Clarkson | June 11, 1935 |
| 2,005,375 | Jones | June 18, 1935 |
| 2,192,106 | Ross | Feb. 27, 1940 |
| 2,775,283 | Greer | Dec. 25, 1956 |